(12) United States Patent
Oki (10) Patent No.: US 7,782,355 B2
(45) Date of Patent: Aug. 24, 2010

(54) IMAGE FORMING APPARATUS USING A PLURALITY OF LASERS WITH A VARYING EXPOSURE RATIO

(75) Inventor: Makoto Oki, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 12/118,986

(22) Filed: May 12, 2008

(65) Prior Publication Data

US 2008/0285991 A1 Nov. 20, 2008

(30) Foreign Application Priority Data

May 14, 2007 (JP) ............... 2007-128637

(51) Int. Cl.
*B41J 2/47* (2006.01)
(52) U.S. Cl. ...................................... 347/253
(58) Field of Classification Search ................. 347/132, 347/240, 251–254, 233
See application file for complete search history.

(56) References Cited

U.S. PATENT DOCUMENTS 5,633,669 A * 5/1997 Hada et al. .................. 347/132

FOREIGN PATENT DOCUMENTS

| JP | 8-164634 | | 6/1996 |
|---|---|---|---|
| JP | 10170845 A | * | 6/1998 |
| JP | 11-291546 | | 10/1999 |
| JP | 11-326798 | | 11/1999 |
| JP | 2003-118161 | | 4/2003 |
| JP | 2003-285466 | | 10/2003 |
| JP | 2004-230654 | | 8/2004 |

* cited by examiner

*Primary Examiner*—Hai C Pham
(74) *Attorney, Agent, or Firm*—Fitzpatrick, Cella, Harper & Scinto (57) ABSTRACT

An electrostatic latent image is formed by exposing the same exposure point on a photosensitive drum to a laser beam having an emission wavelength of 420 nm and a laser beam having an emission wavelength of 780 nm. The exposure is performed in a pulse-height modulation manner by changing a total output of these two laser beams to write the electrostatic latent image while changing an output ratio between the two laser beams depending on the total output.

3 Claims, 8 Drawing Sheets

IMAGE FORMING APPARATUS USING A PLURALITY OF LASERS WITH A VARYING EXPOSURE RATIO

FIELD OF THE INVENTION AND RELATED ART

The present invention relates to an image forming apparatus for forming an electrostatic latent image by subjecting a surface of a photosensitive member to multiplex exposure and more specifically control of an output ratio between respective exposure lights when a plurality of exposure lights having different distributions of light amounts is superposed at the same exposure point.

An image forming apparatus such that an electrostatic latent image is formed by subjecting an electrically charged surface of a photosensitive member to scanning exposure with a plurality of laser beams and is developed into a toner image by depositing electrically charged toner on the electrostatic latent image has been put into practical use. However, multiplex exposure which has already been put into practical use is limited for the purpose of exclusively increasing an image forming speed (process speed) by writing a plurality of scanning lines on the surface of an image bearing member (photosensitive member).

Japanese Laid-Open Patent Application (JP-A) Hei 08-164634 (Document 1) discloses an exposure device such that laser beams having different spot diameters are synthesized (combined) in the same optical path. A single tone gradation image such as a character image or the like is subjected to scanning exposure with a laser beam having a small spot diameter and a multiple tone gradation image is subjected to scanning exposure with a laser beam having a large spot diameter.

JP-A 2003-118161 (Document 2) discloses an image forming apparatus in which two adjacent scanning lines on a photosensitive member are subjected to PWM exposure with large and small (two) laser beams having different spot diameters. An electrostatic latent image is written with a laser beam having a small spot diameter in a low image density area (high light side) and is written with a laser beam having a large spot diameter in combination with the small spot diameter laser beam in a high image density area.

JP-A 2003-285466 (Document 3) discloses an image forming apparatus in which a photosensitive member surface is subjected to scanning exposure by switching large and small laser beams which are synthesized in the same optical path by using a half mirror and have different spot diameters. An electrostatic latent image is written with a laser beam having a small spot diameter in a low image density area (high light side) and is written with a laser beam having a large spot diameter in combination with the small spot diameter laser beam in a high image density area.

JP-A 2004-230654 (Document 4) discloses an image forming apparatus in which a photosensitive member surface is subjected to scanning exposure with a laser beam emitted from a surface emitting laser with a plurality of light source spots disposed with a spacing with respect to a main-scan direction. At least two of the plurality of light source spots are placed in an ON-state to perform multiplex exposure at the same exposure point of the photosensitive member surface, thus synthesizing an amount of exposure of exposure lights (laser beams).

Further, an image forming apparatus including two semiconductor lasers for effecting exposure at the same pixel is also disclosed. For example, JP-A Hei 11-326798 (Document 5) discloses an image forming apparatus including two semiconductor lasers for effecting exposure at the same pixel, wherein one of the semiconductor lasers has a beam spot diameter larger than that of the other semiconductor laser and provides a peak, of beam intensity at the beam spot, smaller than that of the other semiconductor laser.

JP-A Hei 11-291546 (Document 6) discloses that exposure positions of two laser beams on a photosensitive member partially overlap with each other and an image for one dot is formed with these two laser beams.

In the case where a multi-tone gradation image such as a gray-scale image or a full-color image is formed by using dithering, a density pattern method, an area coverage modulation method, or the like, a resolution of the formed image is lower than a resolution (exposure spot diameter (size)) of exposure writing. This is because one color pixel or one density pixel is represented by a plurality of exposure points or exposure length (so-called pulse width modulation (PWM)).

On the other hand, in the case of a single tone gradation image such as a character image or a line image, one pixel can be represented by one exposure point, so that it is possible to form a high-definition image corresponding to the exposure writing resolution (exposure spot diameter).

Further, when an exposure density of a photosensitive member is decreased, an amount of toner per unit area deposited on an exposure area is also decreased. Thus, it is possible to set a pixel density by increasing or decreasing an exposure amount at an exposure point (so-called pulse amplitude (height) modulation (PAM)).

Figure 8:
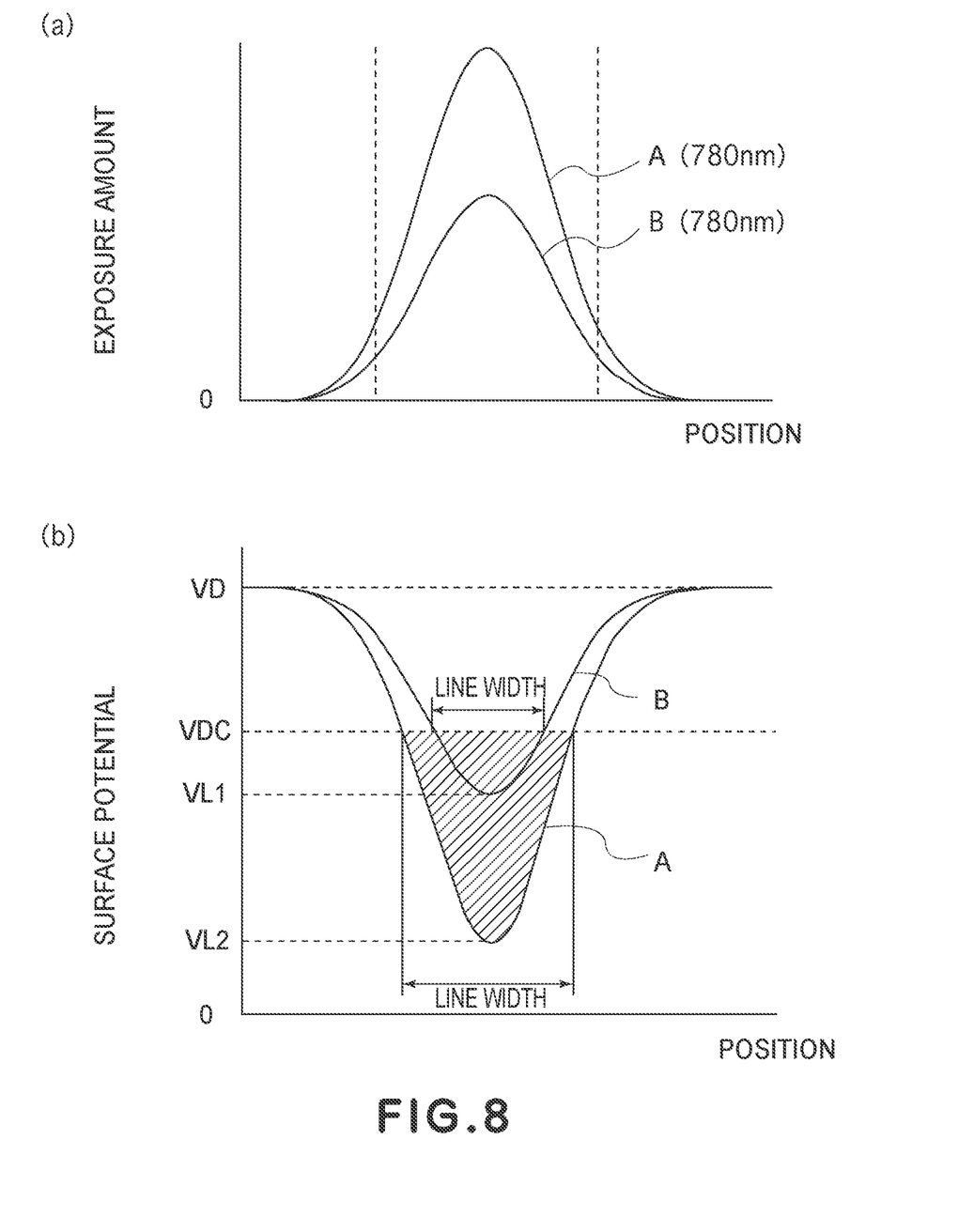
FIGS. 8(a) and 8(b) are schematic views for illustrating a line width of a toner image in the case of exposure with a single laser beam.

However, when the exposure amount of the exposure point is changed, a size of a toner image as a result of development differs even at a constant physical exposure spot size (spot diameter) (FIG. 8). As described later, e.g., in the case of reverse developing method, a toner image at an exposure spot is increased when the exposure amount is increased in size and is decreased when the exposure amount is decreased in size.

As a result, a high-density line drawn by scanning the exposure spot is different in line width from a high-density line drawn by scanning the exposure spot. Thus, thicknesses of characters different in density are changed, so that the characters cannot be recognized as the same font.

SUMMARY OF THE INVENTION

A principal object of the present invention is to provide an image forming apparatus capable of suppressing a change in size or thickness of a toner image depending on an image density.

According to an aspect of the present invention, there is provided an image forming apparatus including: an image bearing member; a charging means for electrically charging the image bearing member; a first exposure means for exposing a surface of the electrically charged image bearing member; a second exposure means for exposing the surface of the image bearing member with a spot size (spot diameter) larger than that of the first exposure member; an image forming means for forming a toner image on a recording material by developing, into a toner image, an electrostatic latent image formed by exposure by the first exposure means and the second exposure means; and a control means for controlling an exposure ratio of the first exposure means so as to increase the exposure ratio with an increasing exposure amount level of an exposure portion to be exposed when the toner image is formed by subjecting the surface of the image bearing member to multiplex exposure with the first exposure means and the second exposure means.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, embodiments of the present invention will be described with reference to the drawings. The present invention can be carried out by embodiments, other than the embodiments described below, in which a part or all of constitutional means or members are replaced by their alternative means or members so long as a synthetic (combined) electrostatic latent image is written on a photosensitive member by subjecting the same exposure point to multiplex exposure. A plurality of exposure operations may be performed simultaneously by spatially overlapping exposure points thereof or performed successively with a time difference.

The present invention can be practiced by not only an image forming apparatus in which respective color toner image forming stations are disposed along an intermediary transfer member but also an image forming apparatus in which the respective color toner image forming stations are disposed along a recording material conveying member. Further, the present invention can also be practiced by an image forming apparatus including respective color developing devices disposed along one image bearing member, an image forming apparatus in which a single color image is directly transferred from one image bearing member onto a recording material, and the like image forming apparatus.

In First Embodiment described below, only a principal portion for formation of a toner image will be described but the present invention can be carried out for various purposes such as printers, various printers, copying machines, facsimile, apparatuses, multi-function machines, and so on by adding necessary equipment, accessories, casing structures thereto.

Further, a constitution of the present invention is not limited to those represented by reference numerals or symbols in the following description.

First Embodiment

Figure 1:
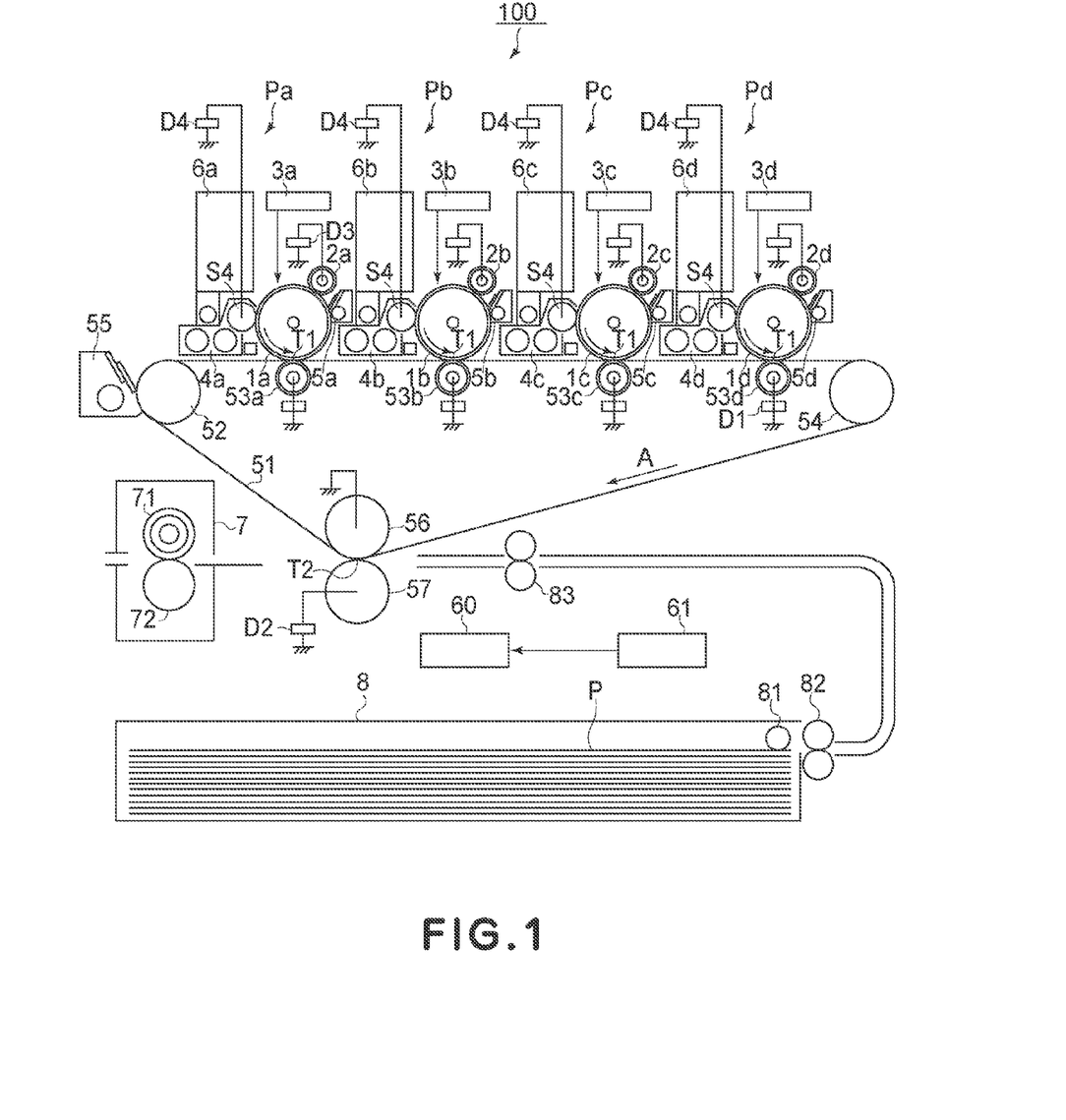
FIG. 1 is a schematic view for illustrating a structure of an image forming apparatus of the First Embodiment of the present invention.

FIG. 1 is a schematic view for illustrating a structure (constitution) of an image forming apparatus of this embodiment.

Image forming stations Pa, Pb, Pc and Pd are similarly constituted except that colors of toners contained in developing devices 4a, 4b, 4c and 4d are different from each other, i.e., yellow (4a), cyan (4b), magenta (4c), and black (4d). Hereinafter, the black image forming station Pd will be principally described. The remaining image forming stations Pa, Pb and Pc should be similarly understood by replacing a suffix alphabet d for respective constitutional means or members at the black image forming station Pd with those (a, b and c) at other image forming stations.

The image forming station includes a photosensitive drum 1d which is a drum-like electrophotographic photosensitive member rotatable in a direction indicated by an arrow and is capable of forming thereon an electrostatic latent image depending on an exposure intensity. Around the photosensitive drum 1d as an example of the photosensitive member, a primary charger 2d, an exposure device 3d, a developing device 4d, a transfer roller 53d, and a cleaning device 5d are disposed.

The exposure device 3d drives a light source with an image signal for a black color component of an original so as to effect scanning exposure of a surface of the photosensitive drum 1d as a uniformly charged image bearing member to form an electrostatic latent image. The exposure device 3d writes the electrostatic latent image on the charged surface of photosensitive drum 1d by effecting multiplex exposure at the same exposure point at the surface of the photosensitive drum 1d by using a first exposure portion and a second exposure portion. As described later with reference to FIG. 5, the second exposure portion provides a higher degree of concentration of light flux density than that of the first exposure portion.

The exposure device 3d effects scanning with two types of laser beams (L1 and L5 in FIG. 3) having different spot sizes at the surface of the photosensitive drum 1d. The laser beam (L5 in FIG. 3) having a narrow exposure area has an emission wavelength shorter than that of another laser beam for exposure (L1 in FIG. 3). The laser beams L1 and L5 are outputted from a surface emitting laser 31 as a common light source.

The developing device 4d carries a two component developer containing electrically charged toner and a carrier on a developing sleeve 84 in a thin film state and rotates the developing sleeve S4 with a slight spacing from the surface of the photosensitive drum 1. Then, a voltage in the form of a DC voltage (hereinafter referred to as a "developing voltage VDC") biased with an AC voltage is applied from a developing power source D4 to the developing sleeve S4, so that toner is electrically deposited from the developing sleeve S4 onto the electrostatic latent image on the photosensitive drum 1d to provide a toner image through development.

The transfer roller 53d forms a transfer electric field at a transfer portion T1 by being supplied with a transfer voltage from a transfer power source D1 and transfers the toner image on the photosensitive drum 1d responsive to the transfer electric field onto an intermediary transfer belt 51.

The cleaning device 5d rubs the surface of the photosensitive drum 1d with a cleaning blade to remove transfer residual toner, on the photosensitive drum 1d, which has passed through the transfer portion T1 without being transferred onto the intermediary transfer belt 51.

In a similar manner, a yellow toner image formed on the photosensitive drum 1a is primary-transferred onto the intermediary transfer belt 51 by a transfer roller 53a. By movement of the intermediary transfer belt 51, the yellow toner image is conveyed to a transfer portion T1 of a photosensitive drum 1b. By this time, a magenta toner image is formed on the photosensitive drum 1b in the same manner as in the case of the yellow toner image and is primary-transferred onto the yellow toner image on the intermediary transfer belt 51 in a superposition manner. Similarly, a cyan toner image is primary-transferred at a transfer portion T1 of a photosensitive drum 1c in the superposition manner and the black toner image is primary-transferred at the transfer portion T1 of the photosensitive drum 1d in the superposition manner. The thus formed four color toner images are conveyed to a secondary transfer portion T2 by the movement of the intermediary transfer belt 51 and are simultaneously secondary-transferred onto a recording material P. In this embodiment, the toner is negatively charged to form a toner image by the reverse developing method. After the surface of the photosensitive drum 1d is electrically charged to a negative dark portion potential (−500 V) by the primary charger 2d, a developing voltage VDC of 350 V is applied to the developing sleeve S4 to cause the negatively charged toner to be deposited on a light portion potential VL portion of the photosensitive drum 1d. Then, the transfer power source D1 outputs a transfer voltage V1 (from 1000 V) to the transfer roller 53d, thus transferring the negatively charged toner image from the photosensitive drum 1d onto the intermediary transfer belt 51.

The recording material P is sent to the secondary transfer portion T2 at a timing synchronized with the movement of the toner image on the intermediary transfer belt 51. The recording material P is stored in a feeding cassette 8 and is separated and picked up one by one by using a pick-up roller 81 and a separation roller 82, thus being placed in a standby state at a position of registration rollers 83. The registration rollers 83 sends the recording material P to the secondary transfer portion T2 at which a leading end of the recording material P can coincide with that of the toner image on the intermediary transfer belt 51. The secondary transfer portion T2 is formed between an outer secondary transfer roller 57 and the intermediary transfer belt 51 by contact of the outer secondary transfer roller 57 with an inner secondary transfer roller 56 via the intermediary transfer belt 51. The inner secondary transfer roller 56 is connected to a ground potential, while to the outer secondary transfer roller 57, a constant transfer voltage V2 (+2000 V to +4000 V) of an opposite polarity to the charge polarity of the toner image is applied from a transfer power source D2. When the transfer voltage V2 is applied to the outer secondary transfer roller 57, the transfer electric field acts on an overlapping portion of the recording material P with the toner image which are nipped and conveyed at the secondary transfer portion T2, so that the four color toner images responsive to the transfer electric field are simultaneously transferred from the intermediary transfer belt 51 onto the recording material P. The transfer residual toner on the intermediary transfer belt 51 having passed through the secondary transfer portion T2 without being transferred onto the recording material P is conveyed to a cleaning device 55 to be removed by a cleaning blade.

The recording material subjected to the secondary transfer of the toner image at the secondary transfer portion T2 is then conveyed to a fixing device 7. The fixing device 7 nips and conveys the recording material P at a fixing nip between a heating roller 71 and a pressing roller 72 and fixes the toner images on the surface of the recording material P under application of heat and pressure. The recording material P on which the toner images are fixed is discharged from an unshown discharge roller to an unshown stacking tray.

A control portion 60 controls the image forming process as described above. Through a panel 61, it is possible to manually set a high-definition mode (character image mode) and a multiple tone gradation mode. When the high-definition mode is set through the panel 61, the control portion 60 controls the exposure device 3d so that an electrostatic latent image is written by effecting pulse amplitude modulation with a laser beam as described later. When the multiple tone gradation mode is set, the laser beam is subjected to pulse width modulation.

<Exposure Device>

Figure 2:
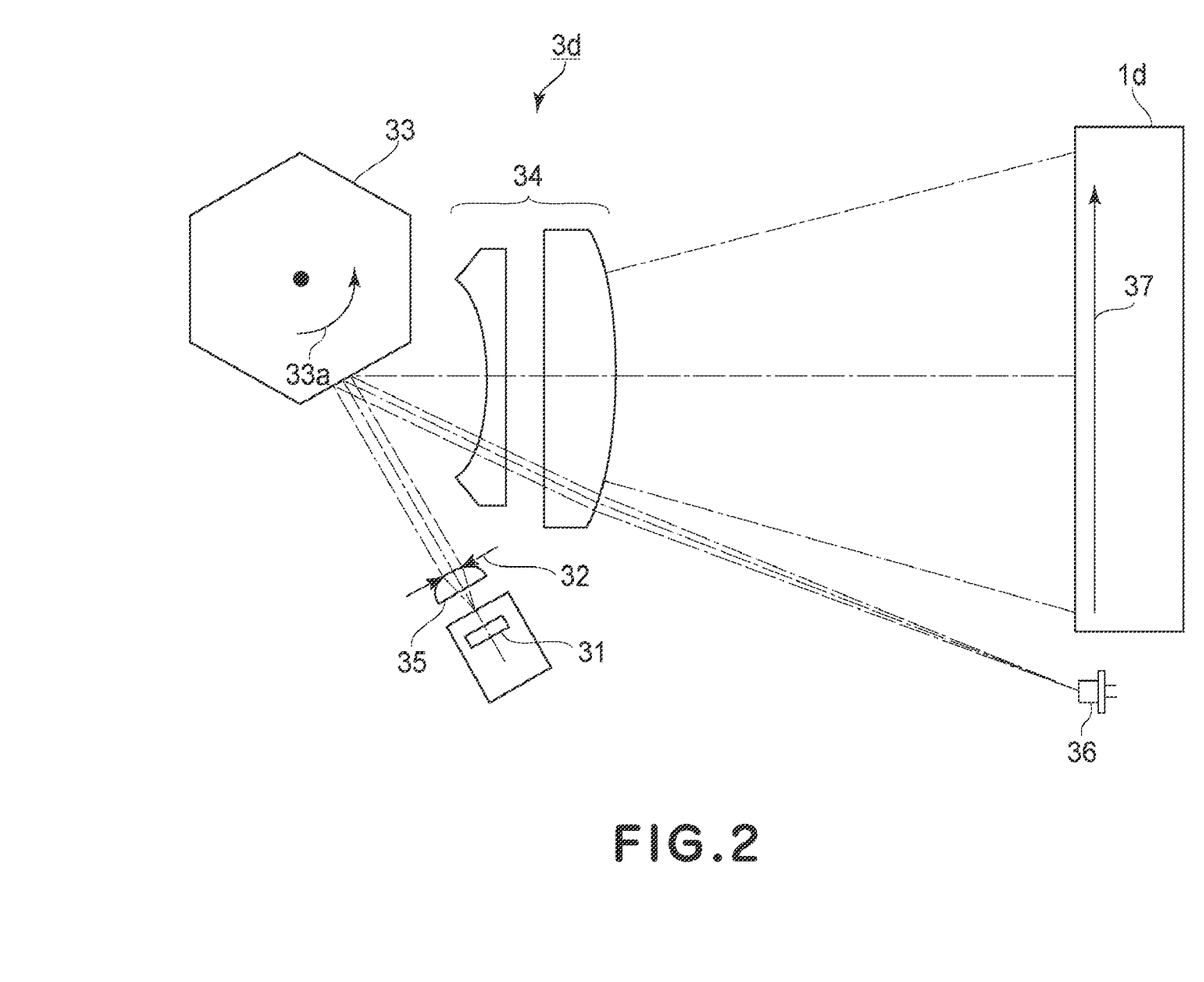
FIG. 2 is a schematic view for illustrating a structure of an exposure device.
Figure 3:
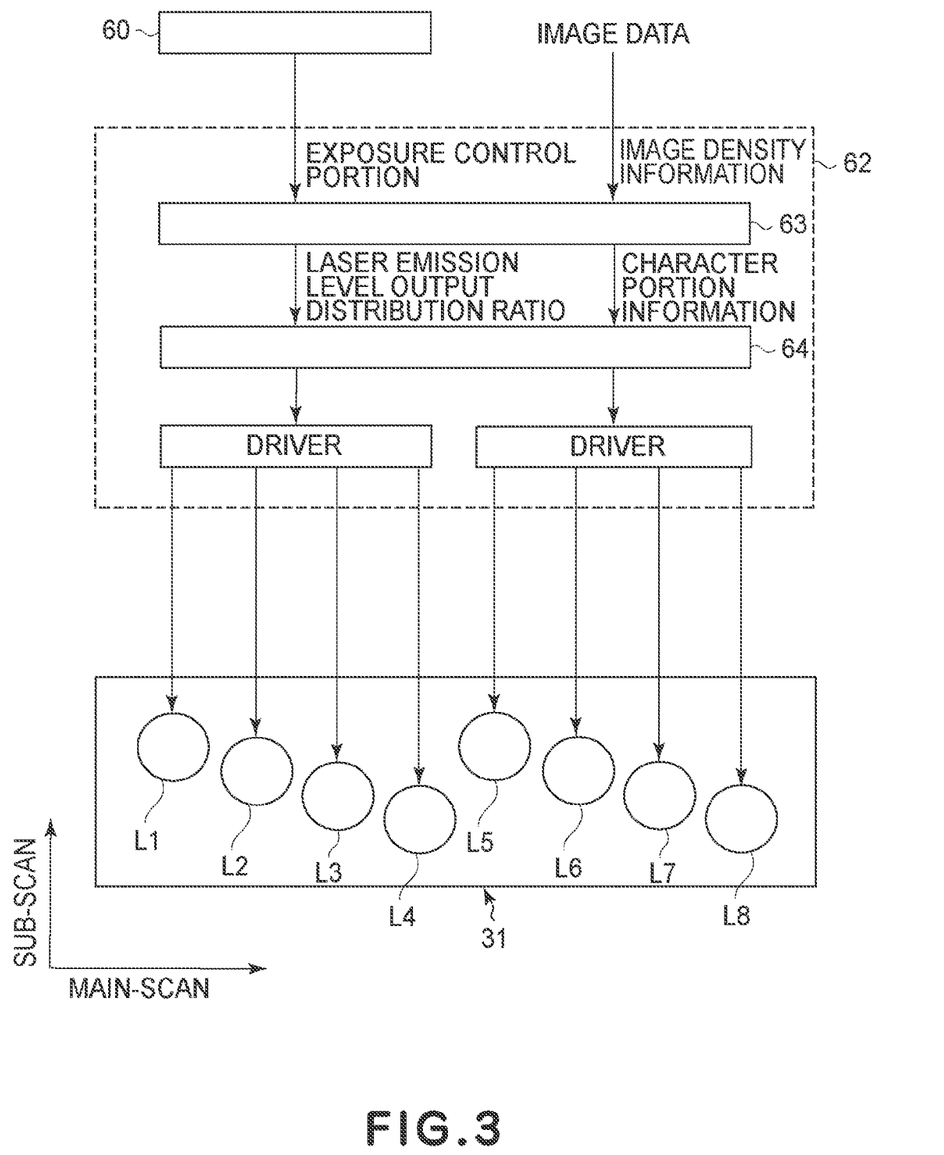
FIG. 3 is a schematic diagram for illustrating a driving circuit of a laser light source.
Figure 4:
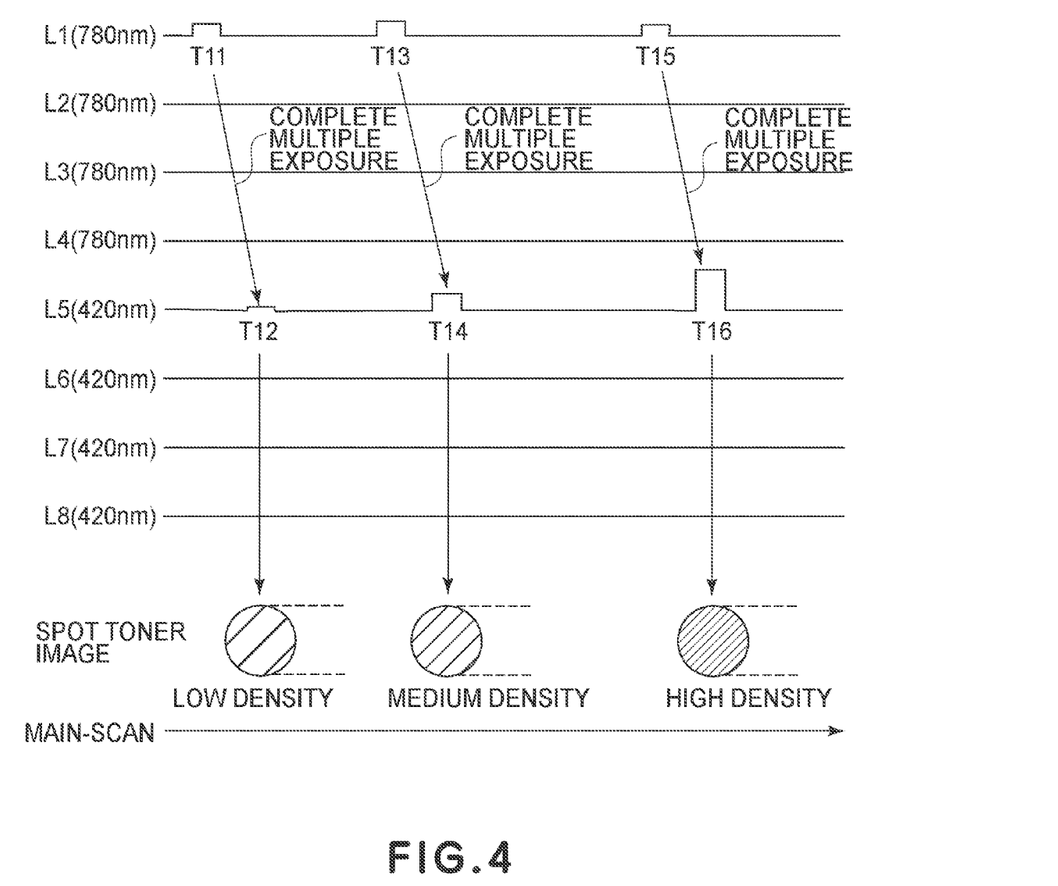
FIG. 4 is a time chart of complete multiplex exposure.

FIG. 2 is an explanatory view of a constitution of the exposure device, FIG. 3 is an explanatory view of a drive circuit of a laser light source, and FIG. 4 is a time chart of complete multiplex exposure. As shown in FIG. 2, the exposure device 3d scans the surface of the photosensitive drum 1d with laser beams outputted from the surface emitting laser 31 through a rotatable polygonal mirror 33 to effect exposure of the surface of the photosensitive drum 1d. As shown in FIG. 3, the surface emitting laser 31 effects double exposure along a scanning line 37 (FIG. 2) by using lasers L1 and L5 which are disposed with a spacing with respect to a scanning (main-scan) direction of the laser beams and have different emission wavelengths.

As shown in FIG. 2, the surface emitting laser 31 outputs a laser beam with an intensity corresponding to an inputted image signal level. A collimator lens 35 changes the laser beam into parallel rays of light and an aperture stop 32 shapes a cross section of the parallel rays of light.

The rotatable collimator lens 33 is driven by an unshown driving motor and rotated in a direction of an arrow 33a with a phase synchronized with rotation (sub-scan) of the photosensitive drum 1d. The laser beams incident on the rotatable polygonal mirror 33 are reflected as polarized beams continuously changing their angles by the rotation of the rotatable polygonal mirror 33, thus entering f-θ lens 34.

The f-θ lens 34 converges the laser beams of the parallel rays of light and forms a light source image of the surface emitting laser 31 on the surface of the photosensitive drum 1d to provide a beam spot. The beam spot forms the scanning line 37 by moving on the surface of the photosensitive drum 1d at a constant speed in an axial direction (main-scan direction) by the rotation of the rotatable polygonal mirror 33. The f-θ lens 34 is an aspherical lens for equally forming a beam spot at each of positions along the scanning line 37 and compensating for time linearity of a scanning angle θ with a scanning speed on the scanning line 37. A PD sensor 36 is an optical sensor for detecting the polarized beam to be synchronized with the drive of the surface emitting laser 31.

As shown in FIG. 3, at a light-emitting surface of the surface emitting laser 31, eight lasers L1 to L8 are disposed. The lasers L1 and L5 are disposed at the same potential level with respect to the sub-scan direction. Similarly, the lasers L2 and L6, the lasers L3 and L7, and the lasers L4 and L8 are disposed at the same positional levels, respectively, with respect to the sub-scan direction. The lasers L2 and L6 are shifted from the positional level of the lasers L1 and L5 by a distance corresponding to 1/4 pixel, in the sub-scan direction. The lasers L3 and L7 are shifted from the positional level of the lasers L1 and L5 by a distance corresponding to 2/4 pixel. The lasers L4 and L8 are shifted from the positional level of the lasers L1 and L5 by a distance corresponding to 3/4 pixel.

An exposure control portion 62, as described in Document 4, an electrostatic latent image for a multiple tone gradation image is written (formed) on the surface of the photosensitive drum 1d by effecting pulse width modulation with laser beams from the lasers L1 to L8 in the case where the multiple tone gradation mode is set by the control portion 60. An image signal forming portion 64 expands a received image data into the scanning line and forms an image signal for each of the lasers L1 to L8 and then actuates a driver circuit for each of the lasers L1 to L8. The image signal forming portion 64 forms a timing signal corresponding to amount of positional shifting with respect to the main-scan direction of the lasers L1 to L8 so that light emission timing of each of the lasers L1 to L8 can synchronize with a beam spot position on the scanning line 37 (FIG. 2).

On the other hand, in the case where the high-definition mode is sent by the control portion 60 or the case where an image data is discriminated as that for a single tone gradation image by an information processing device 63, the exposure control portion 62 writes (forms) an electrostatic latent image for the single toner gradation image on the surface of the photosensitive drum 1d by effecting pulse amplitude modulation with laser beams from the lasers L1 and L5. The image signal forming portion 64 expands a received image data into the scanning line and forms an image signal for each of the lasers L1 and L5 and then actuates a driver circuit for each of the lasers L1 and L5. The image signal forming portion 64 forms a timing signal corresponding to amount of positional shifting with respect to the main-scan direction of the lasers L1 and L5 so that light emission timing of each of the lasers L1 and L5 can synchronize with a beam spot position on the scanning line 37 (FIG. 2). As a result, at each of pixel positions (exposure points) on the scanning line 37 (FIG. 2), complete multiplex exposure (double exposure) is realized. Further, by performing complete multiplex exposure control at each of pixel positions along the scanning line 37 (FIG. 2), it is possible to combine (synthesize) beam spots of the lasers L1 and L5 at the surface of the photosensitive drum 1d. As described above, in the present invention, in an image forming area, double exposure is performed by the lasers having different beam spots on the basis of an image signal, so that it is possible to form an electrostatic latent image.

The lasers L1 to L4 of the surface emitting laser 31 are a red emission semiconductor laser (second exposure means) with an emission wavelength of 780 nm, and the lasers L5 to L8 of the surface emitting laser 31 are a blue emission semiconductor laser (first exposure means) with an emission wavelength of 420 nm. Accordingly, each pixel position on the scanning line 37 shown in FIG. 2 is illuminated by both a beam spot having a larger beam spot diameter by the laser L1 and a beam spot having a smaller beam spot diameter by the laser L5 overlap with each other, so that an amount of exposure of the larger beam spot and an amount of exposure of the smaller beam spot are combined at each pixel position.

Here, the beam spot diameter means a diameter of a light quantity area, of a laser beam spot having a substantially Gaussian distribution for an intensity distribution, ranging from a peak light quantity to $1/e^2$ thereof and is hereinafter represented by "main-scan direction diameter (μm)×sub-scan direction diameter (μm)". The laser beam spot diameter is proportional to $K \times F \times \lambda$ wherein K represents a constant, F represents F number, and λ represents an emission wavelength. For this reason, compared with red emission semiconductor lasers (680 nm, 780 nm), blue emission semiconductor lasers (405 nm, 420 nm) can decrease the beam spot diameter to about ½ of that of the red emission semiconductor lasers by using an optical system with the same F number.

In this embodiment, the beam spot diameter of the lasers L1 to L4 having the emission wavelength of 780 nm is 55 μm×65 μm and the beam spot diameter of the lasers L5 to L8 having the emission wavelength of 420 nm is 21 μm×21 μm. The beam spot of the laser L1 having the emission wavelength of 780 nm and the beam spot of the laser L5 having the emission wavelength of 420 nm are combined to obtain a resolution corresponding to 600 dpi (42 μm).

<Combined Beam Spot in Single Tone Gradation Image>

Figure 5:
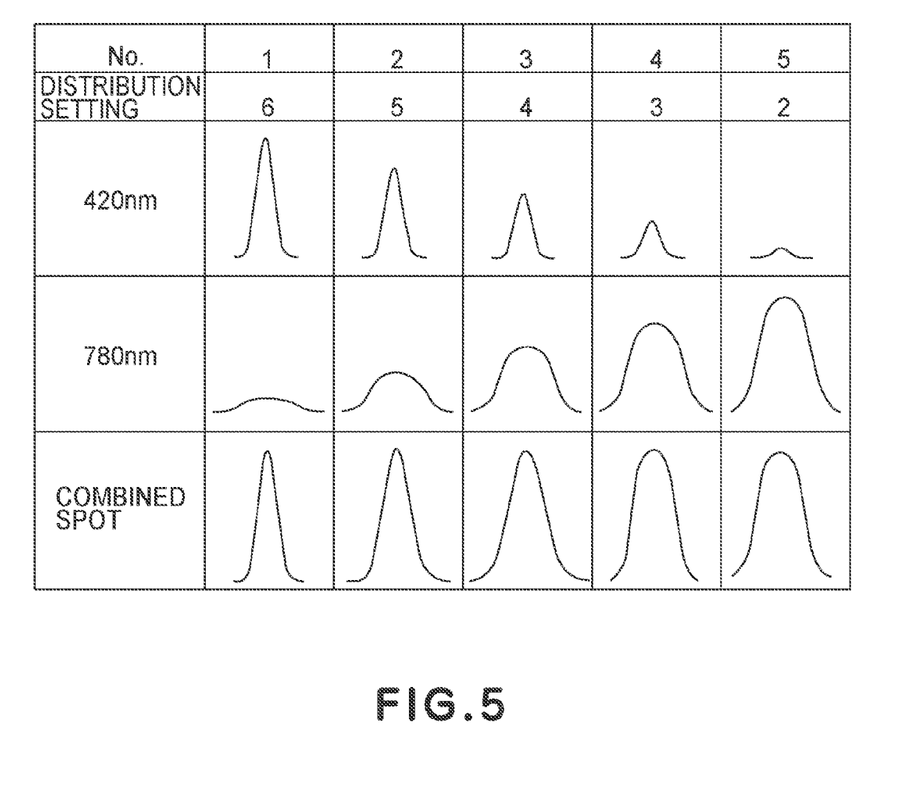
FIG. 5 is an explanatory view of a distribution of an amount of light at a beam spot combined at each of distribution settings.
Figure 6:
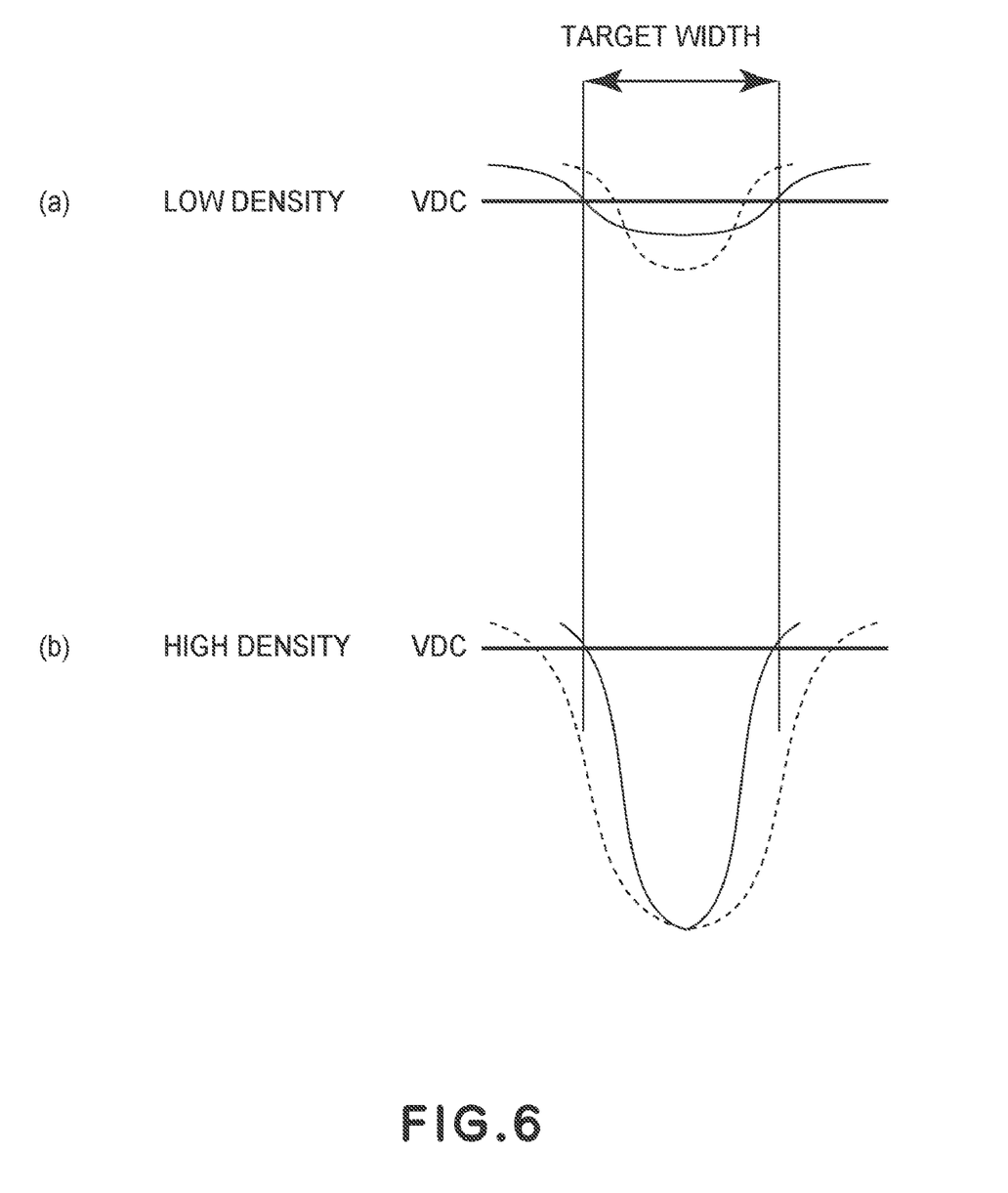
FIGS. 6(a) and 6(b) are schematic views for illustrating an effect of First Embodiment.

FIG. 5 is an explanatory view of a light quantity distribution of a combined beam spot at each of distribution settings, and FIG. 6 is an explanatory view of an effect of this embodiment.

The plurality of lasers for exposure (L1 and L5) includes the laser (L5) providing an exposure area narrower than that of the other laser (L1) at the exposure point. The image forming apparatus 100 has the single tone gradation image mode (high-definition mode) in which a total exposure amount of the plurality of lasers (L1 and L5) is set depending on a density of an image to be formed at an exposure point.

The exposure control means (portion) (62) sets the total exposure amount (laser emission level, exposure amount level) depending on the density of the image to be formed at the exposure point. At the same time, in the case of a large total exposure amount, compared with the case of a small total exposure amount, an exposure ratio per the total exposure amount of the laser (L5) providing the narrower exposure area is increased. The exposure control means (62) sets an output ratio for each of scanning lines (37) along which the surface of the photosensitive drum (1d) is exposed. Specifically, the exposure control means (62) changes an output ratio of the laser (L5) providing the narrower exposure area when the image to be formed is the single tone gradation image and effects pulse width modulation by keeping the output ratio at a constant level when the image to be formed is the multiple tone gradation image.

As described above, the exposure control portion (means) 62 effects complete multiplex exposure such that the exposure point exposed with the laser L5 completely overlaps with the exposure point exposed with the laser L1. As shown in FIG. 4, times T12, T14 and T16 for turning the laser L5 on are set with a predetermined delay time from times T11, T13 and T15, respectively, for turning the laser L1 on. The delay time is set so that the exposure point by the laser L5 completely overlaps with the exposure point by the laser L1 based on parameters including a distance between the lasers L1 and L5 and a rotational speed of the rotatable polygonal mirror 33. In other words, the delay time corresponds to a time required for scanning exposure with respect to a distance between centers of the beam spot of the lasers L1 and L5 on the scanning line 37 (FIG. 2).

As shown in FIG. 3, the information processing portion (device) 63 judges that a scanning line is that for the single tone gradation image in the case where the scanning line for a received image data in the main-scan direction can be regarded as including two tone gradation levels consisting of a high density level and a low density level, i.e., the case of a character image or a line image. The information processing device 63 judges that a scanning line is that for the single toner gradation image also in the case of a single contrast tone gradation combination of gray/white, gray/black, intermediate color/white, primary color/primary color, the like, in addition to two tone gradation levels (white/black).

During exposure along the scanning line judged as that for the single tone gradation image and in the case where the above-described high-definition mode is set, the information processing device 63 performs arithmetic computations of laser emission levels for each of scanning lines on the basis of image density.

Then, depending on the laser emission levels, as shown in Table 1 below, an output distribution ratio (distribution setting) between the laser L1 (to the laser L4) and the laser L5 (to the laser L8) is set at the following seven levels.

TABLE 1

| Emission level | Setting level | L1-L4 (780 nm) | L5-L8 (420 nm) |
|---|---|---|---|
| 0-5 | 1 | 100% | 0% |
| 6-55 | 2 | 90% | 10% |
| 56-105 | 3 | 70% | 30% |
| 106-155 | 4 | 50% | 50% |
| 156-205 | 5 | 30% | 70% |
| 206-250 | 6 | 10% | 90% |
| 251-255 | 7 | 0% | 100% |

Data of Table 1 are stored as a conversion table in the information processing device 63 in advance. As shown in Table 1, a total laser emission level by exposure with both of the laser L1 and the laser L5 is classified into seven levels, to which seven distribution setting levels 1 to 7 are applied, respectively. Specifically, to the laser emission level (0-5), the distribution setting level 1 is applied, so that the exposure is performed substantially by only the laser L1 (emission wavelength: 780 nm). To the laser emission level (251-255), the distribution setting level 7 is applied, so that the exposure is performed substantially by only the laser L5 (emission wavelength: 420 nm). To the intermediary laser emission levels (6-250), in accordance with Table 1, the distribution setting levels 2 to 6 are applied by using both of the laser L1 and the laser L5. When the laser emission level is increased, an output ratio (exposure ratio) of the laser L5 (emission wavelength; 420 nm) is increased, while an output ratio of the laser L1 (emission wavelength: 780 nm) is decreased.

FIG. 5 shows light quantity distributions of each of single beam spots and those of combined beam spots at the distribution setting levels 2 to 6.

In FIG. 5, the light quantity distributions of the beam spots of the laser L5 (emission wavelength: 420 nm) are shown at an upper portion and those of the laser L1 (emission wavelength: 780 nm) are shown at an intermediate portion. Further, the light quantity distributions of the combined beam spots obtained by using both of the lasers L1 and L5 are shown at a lower portion.

In this manner, even at different laser emission levels, beam spots having the substantially same beam spot diameter can be formed on the surface of the photosensitive drum 1d. The light quantity distribution of the beam spot is adjusted by setting the output ratio so that sizes of toner images developed at beam spots are substantially equal to each other even when image densities are different from each other.

For example, in the case of the laser emission level of 128, the distribution setting level 4 is applied, so that the output ratio between the laser L5 (emission wavelength: 420 nm) and the laser L1 (emission wavelength: 780 nm) is 5:5. The original laser emission level is 128, so that each of the lasers L1-L4 and the lasers L5-L8 which are distributed at the output ratio of 5:5 is set to have an output level (laser emission level) of 64.

The exposure control portion 62 (FIG. 3), as shown in FIG. 4, turns the laser L1 on at the output level of 64 at the time T13 and turns the laser L5 on at the output level of 64 at the time T14 with the above described delay time from the time T13.

As a result, an electrostatic latent image (with a medium different between the dark portion potential VD and the light portion potential VL) is synthesized on the photosensitive drum 1d by beam spots with the total laser emission level of 128 and is then developed into a toner image with a medium density.

Similarly, in the case of the laser emission level of 50, the distribution setting level 1 is applied.

The exposure control portion 62 (FIG. 3) turns the laser L1 on at the output level of 45 at the time T11 and turns the laser L5 on at the output level of 5 at the time T12 with the above described delay time from the time T11. As a result, an electrostatic latent image (with a small difference between the dark portion potential VD and the light portion potential VL) is synthesized on the photosensitive drum 1d by beam spots with the total laser emission level of 50 and is then developed into a toner image with a low density. However, the output ratio of the laser L1 (emission wavelength: 780 nm) having the larger beam spot diameter is increased, so that a size of the toner image is substantially equal to that in the case of the laser emission level of 128.

Similarly, in the case of the laser emission level of 210, the distribution setting level 6 is applied.

The exposure control portion 62 (FIG. 3) turns the laser L1 on at the output level of 21 at the time T15 and turns the laser L5 on at the output level of 189 at the time T16 with the above described delay time from the time T16. As a result, an electrostatic latent image (with a large difference between the dark portion potential VD and the light portion potential VL) is synthesized on the photosensitive drum 1d by beam spots with the total laser emission level of 210 and is then developed into a toner image with a high density. However, the output ratio of the laser L5 (emission wavelength: 420 nm) having the smaller beam spot diameter is increased, so that a size of the toner image is substantially equal to that in the case of the laser emission level of 128.

As shown in FIGS. 6(a) and 6(b), in the image forming apparatus of this embodiment, the low density toner image and the high density toner image which are both formed through scanning with two types of laser beams different in emission wavelength have the substantially equal line width. The toner images (high density, medium density, and low density) obtained by developing the electrostatic latent images of the respective beam spots combined with the above described delay time at the developing voltage VDC applied by the developing device 4d (FIG. 1) have the substantially constant size. As a result, these toner images formed by scanning with the combined beam spots also have the substantially equal line width.

In each of FIGS. 6(a) and 6(b), a solid line represents a potential distribution of the electrostatic latent image obtained by the above combined beam spot with respect to a cross-sectional direction of a line of the electrostatic latent image.

In FIG. 6(a), a broken line represents a potential distribution (conventional embodiment 1) of a low density line electrostatic latent image obtained by a beam spot with the laser L5 (emission wavelength: 420 nm) alone.

In FIG. 6(b), a broken line represents a potential distribution (conventional embodiment 2) of a high density line electrostatic latent image obtained by a beam spot with the laser L1 (emission wavelength: 780 nm) alone.

In the case of the conventional embodiment 1 in which image formation is performed with only the laser (emission wavelength: 420 nm) having the smaller spot diameter, a line width of a developed image is small on the low density side. However, in the First Embodiment, on the low density side, the output ratio of the laser (emission wavelength: 780 nm) is increased, so that it is possible to form a high-quality line image without being thinned even in the case of the low density line image.

In the case of the conventional embodiment 1 in which image formation is performed with only the laser (emission wavelength: 780 nm) having the larger spot diameter, a line width of a developed image is small on the high density side. However, in the First Embodiment, on the high density side, the output ratio of the laser (emission wavelength: 420 nm) is increased, so that it is possible to form a high-quality line image without being thickened even in the case of the high density line image.

In the First Embodiment, exposure with a combined light quantity distribution is performed at an exposure point in such a manner that the exposure point is illuminated with both of an optically larger exposure (beam) spot and an optically smaller exposure (beam) spot. Further, a total exposure amount of the plurality of the exposure (beam) spots is changed so as to form an electrostatic latent image at the exposure point depending on the image density by the so-called pulse amplitude modulation. In this case, when the total exposure amount is increased, the toner image as a result of development is thickened. For that reason, an exposure ratio of exposure with the small exposure spot is increased. On the other hand, when the total exposure amount is decreased, the toner image is thinned. For that reason, an exposure ratio of exposure with the large exposure spot is increased.

As a result, a change in line width depending on the image density can be suppressed, so that it is possible to output a high-definition image with less unevenness of quality even when the image density is changed.

Similarly, in the single tone gradation image mode, it is possible to output the high-definition image with less unevenness of quality even when the image density is changed.

Accordingly, a reproducibility of a high-definition character image can be kept at a constant level irrespective of the image density, so that there is no failure in recognition of a resultant font or the like.

<Relationship Between Developing Voltage and Line Width>

Figure 7:
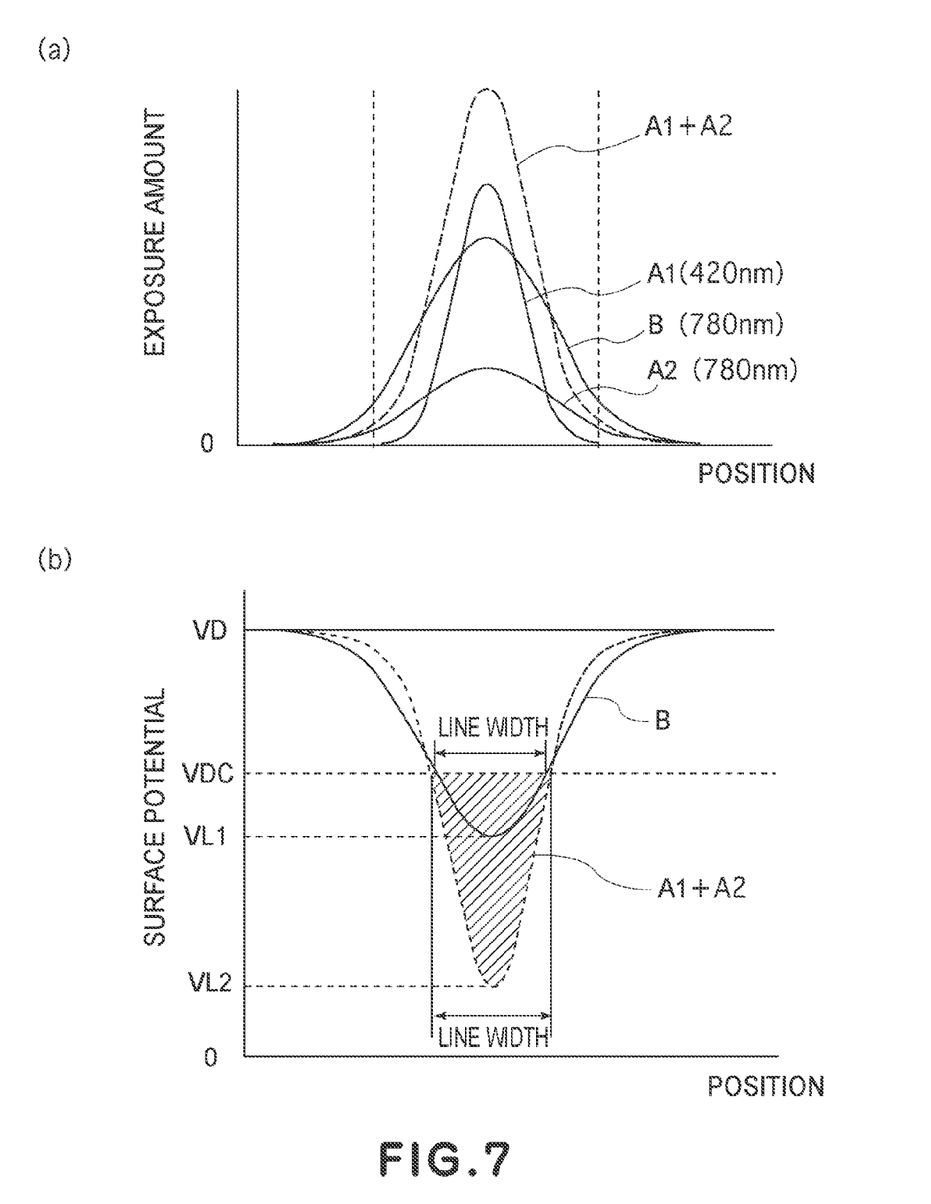
FIGS. 7(a) and 7(b) are schematic views for illustrating a line width of a toner image in the case of exposure with two types of laser beams.

FIGS. 7(a) and 7(b) are schematic views each for illustrating a line width of a toner image in the case where exposure with two types of laser beams is performed. FIGS. 8(a) and 8(b) are schematic views each for illustrating a line width of a toner image in the case where exposure with a single laser beam is performed. FIGS. 7(a) and 7(b) illustrate that the toner image line width can be controlled by combining the two types of laser beams having different emission wavelengths (780 nm and 420 nm) at a distribution setting different from that in Table 1.

In FIG. 7(a), a laser beam exposure B represents a light quantity distribution with respect to the sub-scan direction when the main-scan operation is performed with the laser beam (emission wavelength: 780 nm) in a direction perpendicularly to the drawing of FIG. 1. By the exposure B, as shown in FIG. 7(b), the dark portion potential VD of the photosensitive drum 1d is electrically discharged, so that an electrostatic latent image is formed at a light portion potential VL1. The electrostatic latent image formed by the exposure B is reversely developed by the developing device 4d under application of the developing voltage VDC. At this time, at a potential portion between the light portion potential VL1 and the developing voltage VDC, toner is deposited in an amount corresponding to an amount of electric charges between the light portion potential VL1 and the developing voltage VDC.

Accordingly, the line width of the toner image (a diameter of the toner image at the beam spot) corresponds to a width of an area of a potential equal to the developing voltage VDC, and the toner image density corresponds to a potential difference between the developing voltage VDC and the light portion potential VL1.

In the case of a laser beam exposure A simply increased in output of the laser beam (emission wavelength: 780 nm) used in the laser beam exposure B as shown in FIG. 8(a), a potential difference between the developing voltage VDC and a light portion potential VL2 is larger than the potential difference between VDC and VL1 in the laser beam exposure B, thus increasing the toner image density as shown in FIG. 8(b). However, in the case of the laser beam exposure A and the laser beam exposure B which employ the same light source, even when physical beam spot diameters are equal to each other, toner images obtained through development have different line widths as shown in FIG. 8(b). Accordingly, when the image density is changed by increasing or decreasing the output only by the same light source, a line width of a resultant line image is changed.

In this embodiment, as shown in FIG. 7(a), a laser beam exposure A2 with the laser beam (emission wavelength: 780 nm) and a laser beam exposure A1 with the laser beam (emission wavelength: 420 nm) are combined to provide a combined laser beam exposure (A1+A2). As a result, as shown in FIG. 7(b), it is possible to not only obtain a developing width of a line image equal to that in the laser beam exposure B as shown in FIG. 7(b) but also ensure the light portion potential VL2 (FIG. 7(b)) substantially equal to that in the laser beam exposure A in FIG. 8(b). Therefore, it is possible to form line images which have the equal line width and different image densities.

Other Embodiments

In First Embodiment, as shown in FIG. 3, the number of lasers located at the same positional level with respect to the sub-scan direction of the surface emitting laser 31 is two, so that a combined density tone gradation is provided at each of exposure points through the "double exposure". However, when the number is changed to n, it is also possible to provide a combined density tone gradation at each of exposure points through "n-times of exposure". The n lasers may be different in emission wavelength individually or for each of groups.

In First Embodiment, the two types of laser beams different in emission wavelength illuminate the same exposure point at different times (timings). However, as described in Documents 1 and 3, laser beams may be optically combined so that beam spots are spatially overlapped. Even when two types of exposure operations are performed simultaneously at the same exposure position, an effect similar to that in First Embodiment can be achieved.

In First Embodiment, for each of scanning lines, judgement as to whether the image is the single tone gradation image or not is made and then high-resolution writing is performed. However, it is also possible to perform the high-resolution writing with respect to the entire image after the judgement is made with respect to the entire image.

In the First Embodiment, the surface emitting laser is used as the laser beam light source. However, it is also possible to employ conventional laser light sources such as a surface emitting type semiconductor layer and the like.

In First Embodiment, the band of emission wavelength for the second exposure is set to a shorter wavelength side than the first exposure in order to enhance a degree of concentration of luminous flux density at the exposure point in the second exposure compared with the case of the first exposure. However, the degree of concentration of luminous flux density may also be changed by using methods other than the method using the different bands of emission wavelength.

As one of the methods, the first exposure and the second exposure are performed at the same band of emission wavelength and a broad flux of light by blurring a focus at the photosensitive drum (member) surface in the first exposure. In order to blur the focus, an optical path adjusting member such as a liquid crystal may be disposed so as to overlap with the light source for the first exposure in the optical path. It is also possible to dispose the light sources for the first exposure and the second exposure so as to be shifted from each other in a direction along the optical path. As another method, the first exposure and the second exposure are performed at the same band of emission wavelength and an aperture diameter of the light source for the first exposure is set to be larger than that of the light source for the second exposure.

In the First Embodiment, the pulse amplitude modulation for changing the output ratio between the two types of light source is applied to formation of the single tone gradation image. However, the similar pulse amplitude modulation may also be applied to formation of the multiple tone gradation image. In this case, the output ratio between the two types of light sources can be set for each of the pixels constituting a scanning line.

In the First Embodiment, the toner image is formed by the reverse developing method using the negatively charged toner. However, it is also possible to form a toner image by depositing positively charged toner on an exposed portion of a positively charged photosensitive member.

In the First Embodiment, the reverse developing method is employed. However, it is also possible to achieve a similar effect by using a normal developing method. That is, even in the normal developing method, a lowering in faithful reproducibility of an electrostatic latent image due to an increase in latent image spot by an increase in amount of exposure level is caused to occur. Therefore, it is also possible to obtain a similar effect by controlling an exposure ratio of an exposure means having a small exposure spot size so that the exposure ratio is increased with an increase in the amount of exposure level.

In the First Embodiment, the tone gradation at each of the pixels constituting an image is provided by singly using the pulse amplitude modulation (PAM) for changing the output ratio between the two types of light sources. However, the pulse amplitude modulation may also be performed in combination with another tone gradation control method such as dithering, a density pattern method, or the pulse width modulation (PWM).

In the PWM, half tone pixel formation is performed by modulating a laser beam exposure (irradiation) time depending on an image signal, so that it is possible to form an image with a high resolution and a high tone gradation property. By combining the PWM with the PAM (for changing the output ratio between the two types of light sources), it is possible to realize larger tone gradation levels at a smaller pixel. This is because when a pixel density is further increased in the PWM, a pixel size is decreased relative to a beam spot diameter, so that it is difficult to ensure a sufficient tone gradation by exposure time modulation.

In the conventional image forming apparatus, in order to obtain an optimum spot diameter on a surface to be scanned, an F number of an imaging optical system is changed or a liquid crystal is interposed. For this reason, an exposure device is liable to be complicated to increase in size. Further, it is difficult to quickly change the spot diameter. Particularly, in the case where different types of image information are present in the same image, e.g., in the case where a character image and a multiple tone gradation image are formed, it is difficult to change the spot diameter at high speeds by a mechanical means. Even in the case where the spot diameter is electrically changed by using the liquid crystal or the like, it is necessary to simultaneously change the spot diameter and the laser output depending on the change in light quantity, so that it is very difficult to control the spot diameter and the laser output with accuracy.

The image forming apparatus 100 in the First Embodiment exposure has solved such a problem. Specifically, the image forming apparatus 100 is capable of optimizing the spot diameter precisely at high speeds by using a simple exposure device and simple control. As a result, at a thin line portion such as a character portion, there is no excessive thinning or blurring of a line by the line width or the image density.

According to the present invention, it is possible to provide an image forming apparatus capable of suppressing a change in size or thickness of a toner image depending on an image density by forming an image through multiplex exposure with laser beams from exposure means having different exposure spot sizes (spot diameters).

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 128637/2007 filed May 14, 2007, which is hereby incorporated by reference.

What is claimed is:

1. An image forming apparatus comprising:
  an image bearing member;
  a charging device configured to electrically charge said image bearing member;
  an exposure device configured to expose a surface of said image bearing member electrically charged by said charging device, said exposure device comprising a first exposure portion configured to expose the surface with a first laser and a second exposure portion configured to expose the surface with a second laser providing a laser spot size larger than that of the first exposure portion;
  an image forming station configured to form a toner image on a recording material by developing, into the toner image, an electrostatic latent image formed by exposure by said exposure device; and
  a control portion configured to control the first exposure portion or the second exposure portion so that an exposure ratio of the first laser to the second laser when an image is formed with a first density is higher than when the image is formed with a second density lower than the first density, and the exposure ratio when the image is formed with the second density is higher than when the image is formed with a third density lower than the second density.

2. An apparatus according to claim 1, wherein the first laser has a shorter emission wavelength than that of the second laser.

3. An apparatus according to claim 1, wherein said control portion is configured to at least selectively execute a first mode in which the exposure ratio of the first laser to the second laser is increased with the increasing density level of the image to be formed and a second mode in which the exposure ratio of the first laser to the second laser is kept constant with the increasing density level to increase an exposure time per unit area.

* * * * *